May 12, 1964 G. W. CORNELIUS Re. 25,576

APPARATUS FOR CONSUMING THE UNBURNED PRODUCTS OF COMBUSTION OF AN INTERNAL COMBUSTION ENGINE

Original Filed Nov. 1, 1954 4 Sheets-Sheet 1

INVENTOR.

George W. Cornelius.

BY

Francis A. Utecht, Jr.

Atty.

INVENTOR.
George W. Cornelius.
BY
Francis A. Utecht, Jr.
Atty.

APPARATUS FOR CONSUMING THE UNBURNED PRODUCTS OF COMBUSTION OF AN INTERNAL COMBUSTION ENGINE

Original Filed Nov. 1, 1954 4 Sheets-Sheet 3

INVENTOR.
George W. Cornelius.
BY
Francis A. Utacht, Jr.
Atty.

INVENTOR.
George W. Cornelius.
BY
Francis A. Utecht, Jr.
Atty.

United States Patent Office

Re. 25,576
Reissued May 12, 1964

25,576

APPARATUS FOR CONSUMING THE UNBURNED PRODUCTS OF COMBUSTION OF AN INTERNAL COMBUSTION ENGINE

George W. Cornelius, Palos Verdes Estates, Calif., assignor to Holley Carburetor Company, Van Dyke, Mich.

Original No. 2,851,852, dated Sept. 16, 1958, Ser. No. 466,044, Nov. 1, 1954. Application for reissue July 8, 1959, Ser. No. 825,858
21 Claims. (Cl. 60—30)

Matter enclosed in heavy brackets [ ] appears in the original patent but forms no part of this reissue specification; matter printed in italics indicates the additions made by reissue.

The present invention relates generally to the field of internal combustion engines and more particularly to a novel apparatus for consuming the unburned products of combustion exhausted from an internal combustion engine.

It is well known that the unburned products of combustion exhausted from the internal combustion engines of automotive vehicles constitute a prime source of the so-called "smog" which exists in and around the principal population centers of the country. The harmful effects of this smog upon both animate and inanimate objects are likewise very well known. Although many forms of apparatus for consuming these unburned products of combustion have been heretofore proposed, such devices have for various reasons proven to be unsatisfactory and accordingly are not now in general usage.

It is a major object of the present invention to provide an effective apparatus for consuming the unburned products of combustion exhausted from an internal combustion engine.

Another object is to provide apparatus of the aforedescribed nature that is comparatively simple in design and rugged of construction whereby it may afford a long and trouble-free service life.

A further object of the invention is to provide an apparatus of the aforedescribed nature that may be readily installed upon the engine of any conventional automotive vehicle.

It is yet another object to provide apparatus of the aforedescribed nature that is foolproof and entirely automatic in operation.

These and other objects and advantages of the present invention will become more apparent from the following detailed description, when taken in conjunction with the appended drawings wherein.

Figures 1, 2, 3:
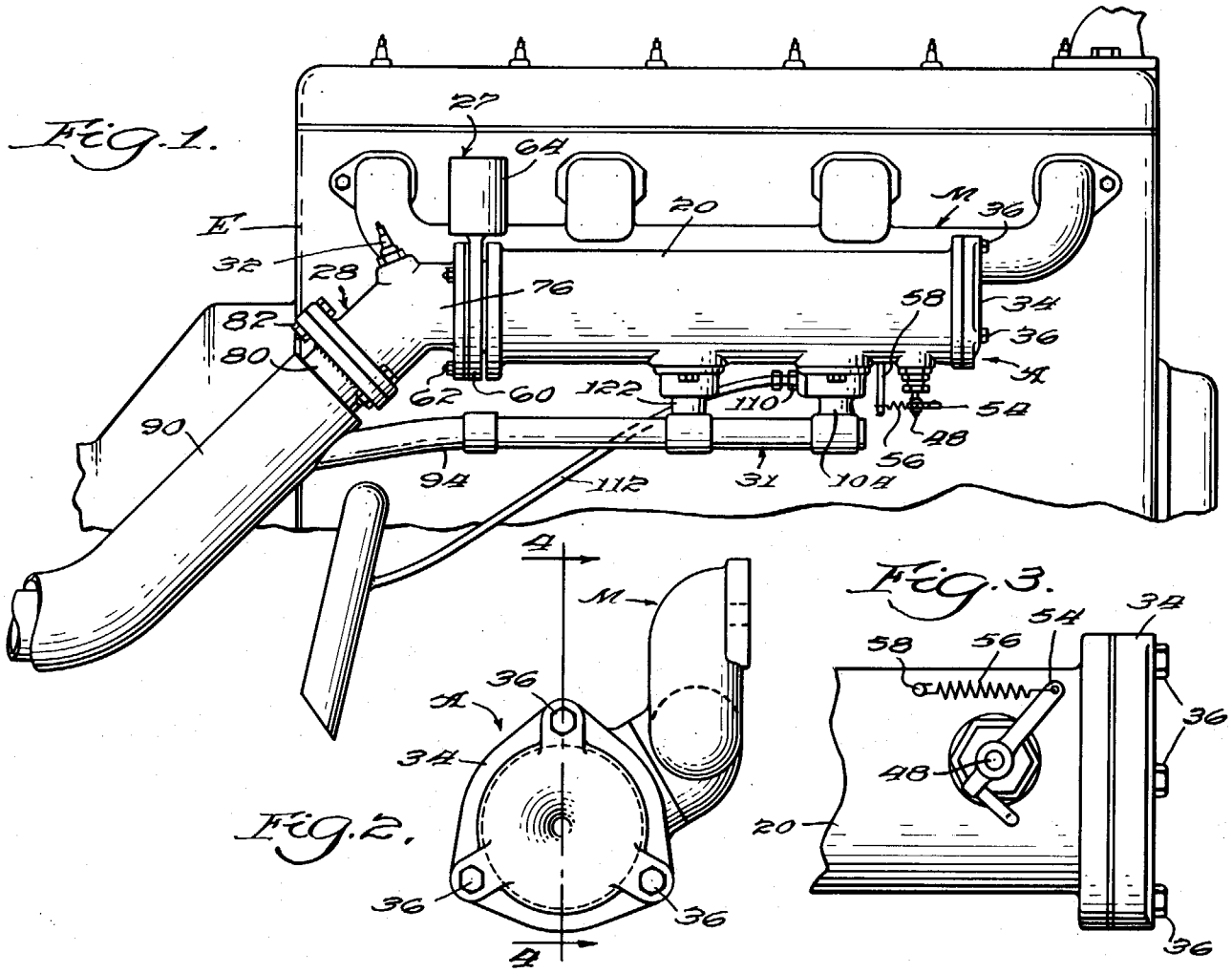
FIGURE 1 is a side elevational view of a preferred form of apparatus embodying the present invention mounted upon an internal combustion engine.
FIGURE 2 is a front view of said apparatus.
FIGURE 3 is a fragmentary enlarged bottom view of a detail of said apparatus.

Referring to the drawings and particularly FIGURES 1 through 5 thereof, a preferred form of apparatus A embodying the present invention is shown mounted upon one side of a conventional internal combustion engine E having an exhaust manifold M. The preferred form of apparatus A broadly comprises a cylindrical housing, generally designated 20, that may form an integral part of the engine's exhaust manifold M. Formed within this housing 20 are a first venturi, generally designated 22, and a second smaller venturi, generally designated 24, the latter being coaxial with and concentric to the first venturi 22. A control valve, generally designated 26, is disposed forwardly of the venturis 22 and 24 and is adapted to control the flow of exhaust gas through the two venturis. A pressure dome, generally designated 27, is disposed adjacent the outlet of the large venturi 22. A discharge pipe, generally designated 28, extends downwardly and rearwardly from the rear end of the housing 20. A main flame holder, generally designated 29, is arranged between the rear of the housing 20 and the front of the discharge pipe 28. An auxiliary flame holder 30 is mounted in the smaller venturi 24. An air-intake manifold, generally designated 31, positioned below the housing 20 is adapted to introduce air into the two venturis 22 and 24. A spark plug 32 is mounted rearwardly of the flame holder 29.

In the operation of the preferred form of apparatus A, exhaust gases issuing from the exhaust manifold M will enter the front of the housing 20 and pass rearwardly through the venturis 22 and 24 into the discharge pipe 28. These exhaust gases contain a certain percentage of unburned products of combustion which are adapted to be consumed in the housing 20. Air is introduced into the housing through the air-intake manifold 31 so as to effect complete burning of these products of combustion. The spark plug 32 assists in supporting the combustion of the mixture of unburned products of combustion and air. The control valve 26 is arranged to direct all of the exhaust gases through the small venturi 24 during idling and deceleration of the engine E. During other opening conditions of the engine, however, the exhaust gases will also pass through the large venturi 22.

Figures 4, 5:
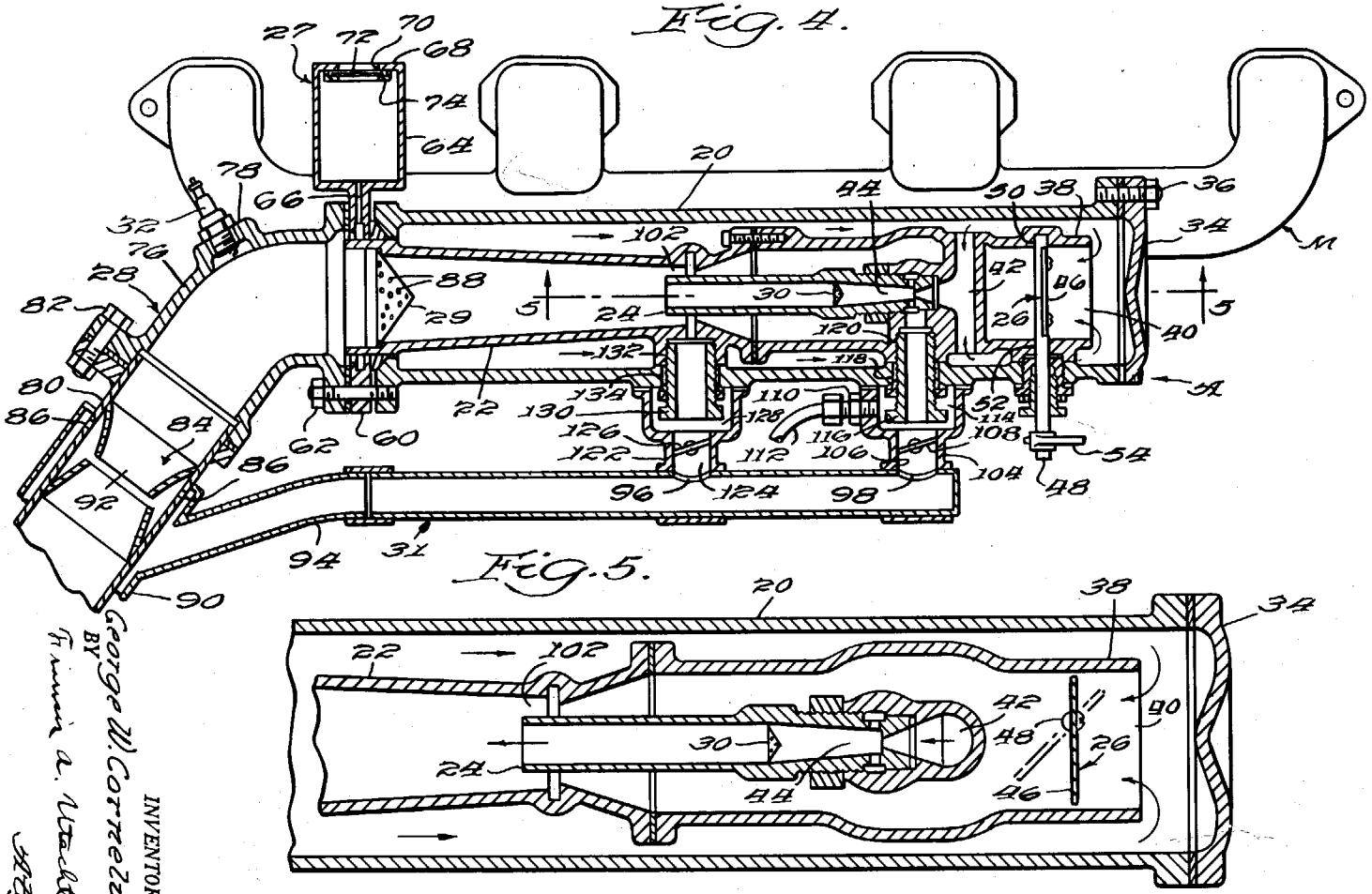
FIGURE 4 is a central vertical sectional view of said apparatus.
FIGURE 5 is an enlarged horizontal sectional view taken along line 5—5 of FIGURE 4.

More particularly, the housing 20 is provided with a front cover 34 which is secured in place by bolts 36. Rearwardly of the front cover 34 there is mounted a guide member, generally designated 38, which directs the exhaust gases entering the front end of the housing at 40 into the front portion of the two venturis 22 and 24. The front portion of this guide member is of cylindrical shape and it encloses the control valve 26. When the control valve 26 is disposed in its closed position of FIGURES 4 and 5, all of the exhaust gases will pass through a transverse passage-way 42 into the throat 44 of the smaller venturi 24. When the control valve 26 is moved to its open position indicated by dotted outline in FIGURE 5, however, these exhaust gases will also flow into the front end of the larger venturi 22. The control valve 26 may be of the butterfly type having a plate 46 which is secured upon a vertical shaft 48 in an off-center relationship as shown in FIGURE 5. The latter is journaled between aligned vertical bores 50 and 52 formed in the front portion of the guide member 38. The lower portion of the shaft 48 is keyed to a cross-arm 54, as shown in FIGURES 1, 3 and 4. The free end of this cross-arm 54 is connected to one end of a tension spring 56. The latter has its opposite end rigidly secured to retainer 58 which depends from the underside of the housing 20. With this arrangement, the plate 46 is normally biased to its closed position of FIGURES 4 and 5. Since the shaft 48 is offset from the central axis of this plate, however, the exhaust gases entering the front end of the housing at 40 will tend to rotate the shaft and hence pivot the plate 46 to its dotted position of FIGURE 5. The amount of pivoting force exerted upon the plate 46 will be proportional to the pressure of the exhaust gases entering the front end of the guide member 38.

Figure 3A:
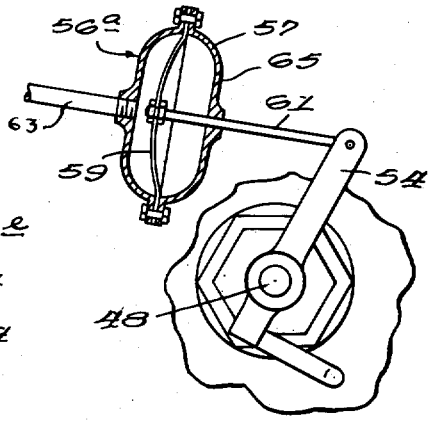
FIGURE 3a is a view similar to FIGURE 3 showing a modified form of said detail.

Referring to FIGURE 3a, there is shown a modified arrangement wherein the tension spring 56 is replaced by a diaphragm type control unit 56a. This unit includes a metallic case 57 wherein is mounted a flexible diaphragm 59. The center of this diaphragm 59 is affixed to the rear end of a rod 61 that is pivotally connected at its front end to the free end of the cross-arm 54. The rear surface of the diaphragm 59 is in communication with the intake manifold of the engine by means of a conduit 63. The front of the case 57 is vented to the atmosphere by a vent hole 65. With this arrangement, the plate 46 of the control valve 26 will be biased towards a closed position by a force that is proportionate to the value of the intake manifold vacuum of the engine.

The pressure dome 27 includes a ring-like element 60 which is rigidly affixed to the rear end of housing 20 by means of a plurality of bolt and nut combinations 62. The upper end of this ring-like element 60 integrally merges into a cylinder 64. The interior of the cylinder 64 is in communication with the rear end of the large venturi 22 by means of a vertical passage-way 66. The upper wall 68 of the cylinder 64 is formed with an aperture 70. This aperture 70 overlies a floating disc 72 which is normally supported by a retaining element 74 that depends from the upper closure 68.

The discharge pipe 28 includes an elbow 76 having its front end rigidly connected to the rear end of the ring-like element 60 of the pressure dome 27 by the bolt and nut combinations 62. The midportion of the elbow 76 is formed with a seat 78 for the spark plug 32. The rear end of the elbow 76 is bolted to the upper end of a downwardly and rearwardly extending tail pipe 80 by means of bolt and nut combinations 82. A venturi 84 is formed at the upper portion of the tail pipe 80 slightly below the latter's connection to the elbow 76, as shown in FIGURE 4. A plurality of circumferentially spaced ports 86 are formed in the tail pipe 80 adjacent the venturi 84.

Referring to FIGURE 4, the main flame holder 29 is of frusto-conical configuration and it is formed with a plurality of apertures 88. The flame holder 29 is rigidly retained within the rear end portion of the large venturi 22. The auxiliary flame holder 30 is similar in construction to the main flame holder 29 but of smaller dimensions.

The air intake manifold 31 is shown in detail in FIGURE 4. It includes a duct 90 which concentrically encompasses the tail pipe 80, extending downwardly along its length for some distance. The upper end of this duct 90 is in communication with the throat 92 of the venturi 84 by means of the ports 86 formed in the tail pipe 80. The upper portion of the duct is connected to a forwardly extending tube 94 which underlies the housing 20. This tube 94 is formed with a pair of bores 96 and 98. The front bore 98 is in communication with the throat 44 of the small venturi 24 while the rear bore 96 is in communication with the throat 102 of the large venturi 22. The front end of the tube 94 is rigidly secured to the underside of the housing 20 by means of a valve housing 104. The latter includes a vertically extending passageway 106 that forms a continuation of the front bore 98. A butterfly valve 108 disposed within this passage-way 106 is manually adjustable to control the amount of air passing therethrough. The rear portion of the valve housing 104 mounts a threaded fitting 110 which is attached to a length of tubing 112. The opposite end of the tubing 112 is in communication with the crank case of the engine E for a purpose to be set forth hereinafter. The upper portion of the valve housing 104 includes a cylindrical cavity 114. The latter cavity 114 encompasses an externally threaded bushing 116 that extends upwardly through an aperture 118 in the underside of housing 20 into a bore 120 formed in the lower portion of the guide member 38.

A second valve housing 122 similar to valve housing 104 is interposed between the midportion of the tube 94 and the underside of the housing 20. This second valve housing 122 includes a vertically extending passageway 124 which forms an upward continuation of the rear bore 96. A second butterfly type control valve 126 is mounted in this passage-way. This valve 126 is also manually adjustable so as to control the amount of air flowing through the passageway. The upper portion of this valve housing 122 defines a cylindrical cavity 128 wherein is disposed a second upwardly extending bushing 130 having its upper end threadably received within a bore 132 formed in the lower portion of the large venturi 22. This second bushing extends through an aperture 134 formed in the underside of the housing 20 in line with aperture 118.

In the operation of the apparatus shown in FIGURES 1 through 5, exhaust gases formed by the engine E will pass from the exhaust manifold M through the front of the housing 20 at 40. Assuming that the engine is operating at idling speed the force of the exhaust gases entering the front portion of the guide member 38 will not be of sufficient magnitude to affect the opening of the control valve 26. Accordingly, these exhaust gases will enter the throat 44 of the smaller venturi 24 by means of the transverse passageway 42. The flow of the exhaust gases through the throat of the venturi 24 will serve to aspirate fresh air into the throat through the air intake manifold 31, such fresh air entering this manifold through the open lower end (not shown) of the tube 90. It should be observed that the incoming fresh air entering through the lower end of the tube 94 will pass upwardly and forwardly over the external surface of the tailpipe 80 in heat-transfer relationship thereto. Accordingly, this fresh air will enter the throat of the venturi 24 in a heated condition. The mixture of fresh air and exhaust gases will undergo burning within the venturi structure. It should be noted that the gases leaving the rear end of the small venturi 24 will also aspirate a certain amount of fresh air through the rear valve housing 122.

As the rotational speed of the engine increases, the pressure of the exhaust gases entering the front of the housing 20 to 40 will increase to such a magnitude that the plate 46 of the control valve 26 will be forced open, as indicated by its dotted outline in FIGURE 5. The exhaust gases will then pass through the front of the guide member 38 into the throat 102 of the large venturi 24. The passage of these gases through the throat of the large venturi will aspirate air through the air intake manifold 31, such air passing upwardly through the valve housing 122. The mixture of fresh air and exhaust gases will pass rearwardly and undergo burning adjacent the main flame holder 29. It has been determined that such burning will normally take place at the point within the rear portion of the large venturi at which the velocity of the expanding gases equals the velocity of the gases entering the front end or sinking chamber of the venturi. This will generally be the point at which the diameter of the diffuser end portion of the venturi equals the diameter of the front end of the venturi. It has been found to be advisable to locate the main flame holder 29 at this point.

Such burning is assured by the positioning of spark plug 32 adjacent this point. The spark plug may be energized by means of an ignition coil (not shown) which is caused to spark during each power stroke of the engine's pistons. The pressure dome 27 under normal operating conditions will furnish additional fresh air to the rear end of the large venturi through its aperture 70.

Should the force of the exhaust gases momentarily increase, the floating disc 72 will be urged upwardly so as to seal the aperture 70. In this manner the pressure dome serves as a pressure dampener whereby the gases will flow smoothly through the apparatus despite pressure fluctuations thereof. If such flow were not comparatively smooth the flame existing within the rear portion of the large venturi could be extinguished. The existence of this pressure dome at the rear portion of the large venturi also prevents backfiring within the system.

The venturi 84 formed at the upper portion of the tailpipe 80 serves to aspirate heated fresh air into the upper end of the tailpipe. The introduction of heated fresh air at this point serves to complete any burning of the unburned products of combustion exhausted from the engine within the upper end of the tailpipe. It is desirable that no burning take place below this point. The venturi 84 likewise assists in preventing backfiring in the system. It should be noted that the tubing 112 which interconnects the crank case of the engine E with the valve housing 104 serves to scavenge oil vapors from the crank case. During deceleration of the engine E the restrictive effort of the gases flowing through the throat 44 of the small venturi 24 pressurizes these combustion chambers so as to diminish the vacuum created therein while the carburetor is operating in a closed throttle position. Accordingly, the tendency of the combustion chambers to suck oil upwardly from the crank case during deceleration will be minimized.

*It should be particularly observed with reference to FIGURE 4 that the incoming exhaust gases flowing through the housing 20 towards the front end 34 of the latter are in heat transfer relationship with the external walls of the venturi 22. These external walls are heated to a temperature in excess of the exhaust gas temperature by the aforedescribed burning of the mixture of fresh air and exhaust gases adjacent the flame holder 29. Accordingly, the incoming exhaust gases will be raised in temperature as they flow through the housing 20. This is important to the operation of the afterburner apparatus since it increases the burning efficiency thereof during the comparatively short time available for effecting such burning as the exhaust gases pass through the afterburner. In prior afterburners the incoming exhaust gases flow directly to the burning chamber without being preheated in this manner.*

When the diaphragm type control unit 56a shown in FIGURE 3a is utilized, during cruising speed a certain amount of exhaust gas may flow through the small venturi 24 so as to cause the latter to aspirate heated air into its confines. This is true because as the intake manifold pressure decreases the diaphragm 59 will permit the cross-arm 54 to pivot the control valve 26 towards a closed position.

Figure 6:
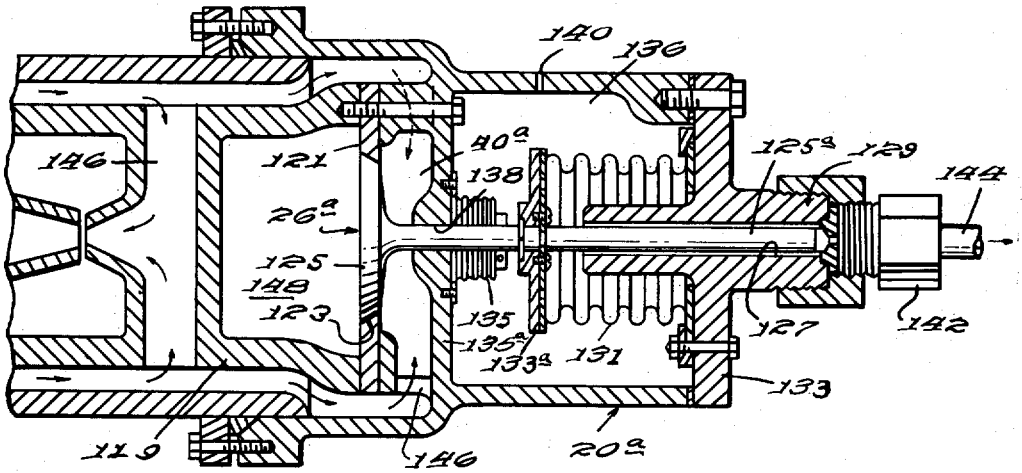
FIGURE 6 is a central vertical sectional view of an alternate type of control valve which may be utilized with said apparatus.

Referring now to FIGURE 6 there is shown another type of control valve 26a which may be utilized with the aforedescribed apparatus. This alternate form of control valve is housed within a modified form of guide member 119. The front wall 121 of the latter is formed with a beveled valve seat 123 for use with a poppet valve 125. The front end of the stem 125a of the poppet valve 125 is slidably disposed within a bore 127 formed in a guide element 129 which forms a front closure for the housing 20a. A metallic bellows 131 is interposed between the rear surface of the front wall 133 of the guide element 129 and an annular plate 133a which is rigidly secured to the mid-portion of the poppet valve stem 126. A second smaller metallic bellows 135 is interposed between the poppet valve stem 125a and a wall 135a formed forwardly of the guide member's front wall 121. This second bellows 135 serves to seal the chamber 136 between the guide element 129 and the wall 135a from exhaust gases entering the housing 20a at point 40a from the exhaust manifold of the engine E, the rear portion of the valve stem 125a passing through a bore 138 formed in the wall 135a. The interior of the chamber 136 is vented to the atmosphere at 140. The front end of the annular plate 133a is in communication with the intake manifold vacuum of the engine E by means of a threaded fitting 142 and a length of tubing 144.

The modified form of control valve 26a is adapted to operate under the influence of the pressure differential between the exhaust and the intake manifolds of the engine E. At idling, the frontal area of the poppet valve 125 is exposed to the exhaust pressure entering the housing at the point 40a through bores 146. The interior of the bellows 131 is concurrently exposed to the pressure existing within the intake manifold of the engine E. Thus, in a typical example the exhaust pressure may be assumed as being two pounds while the intake manifold vacuum may be assumed as being ten pounds. Inasmuch as the frontal area of the poppet valve 125 and the frontal area of the annular plate 133a are approximately equal the poppet valve would be urged forwardly to its position of FIGURE 6 so as to be seated within the valve seat 123. Accordingly, all of the exhaust gases entering the housing 20a at the point 40a would enter the throat of the small venturi 24 through the transverse passage-way 146. If the rotational speed of the engine is then increased,, the intake manifold pressure will decrease while the pressure of the exhaust gases will increase. Accordingly, the poppet valve 125 will be urged rearwardly away from the valve seat 123 into an open position and exhaust gases entering the housing 20a at the point 40a will flow through the passage-way 148 formed in the guide member 119 to the front of the large venturi 22.

Figure 7:
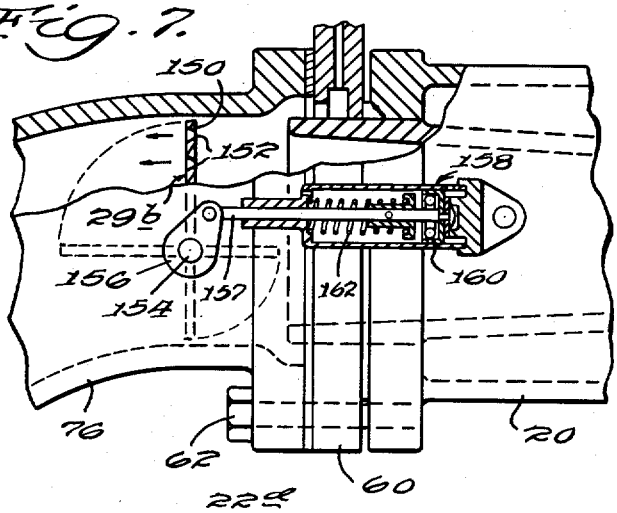
FIGURE 7 is a side elevation, taken partly in central vertical section, of an alternate type of flame holder which may be utilized with said apparatus.

Referring now to FIGURE 7 there is shown an alternate type of flame holder 29b which may be used with the aforedescribed apparatus. This flame holder 29b is adapted to replace that shown in FIGURE 4. It includes a disc 150 formed with a plurality of apertures 152. Each of these apertures has a frusto-conical configuration and the sum of their areas should approximate the area of the front end of the large venturi 22. The disk 150 is supported off-center by a horizontal pivot pin 154. The pivot pin 154 is journaled by the elbow 76 and it is keyed at one side to a cross-arm 156. The free end of the cross-arm 156 is pivotally secured to the rear end of a rod 157. The rod 157 is axially slidably mounted within a cylindrical dashpot member 158. This member 158 includes a piston 160 secured to the front of the rod 157 and a helical compression spring 162 interposed between the left side of the piston and the rear end wall of the dashpot cylinder 16. With this arrangement, during idling conditions the disc 150 will remain in its solid line position of FIGURE 7. When the rotational speed of the engine is increased, the velocity of the exhaust gases will likewise increase and the disc 150 will be pivoted towards its open position indicated by dotted lines in this figure. The point at which the burning of the gases flowing through the apparatus takes place may then move rearwardly. The dashpot 158 serves to prevent flutter of the disc 150. The sum of the areas of the apertures 152 should approximate the area of the front end of the large venturi 22.

Figure 8:
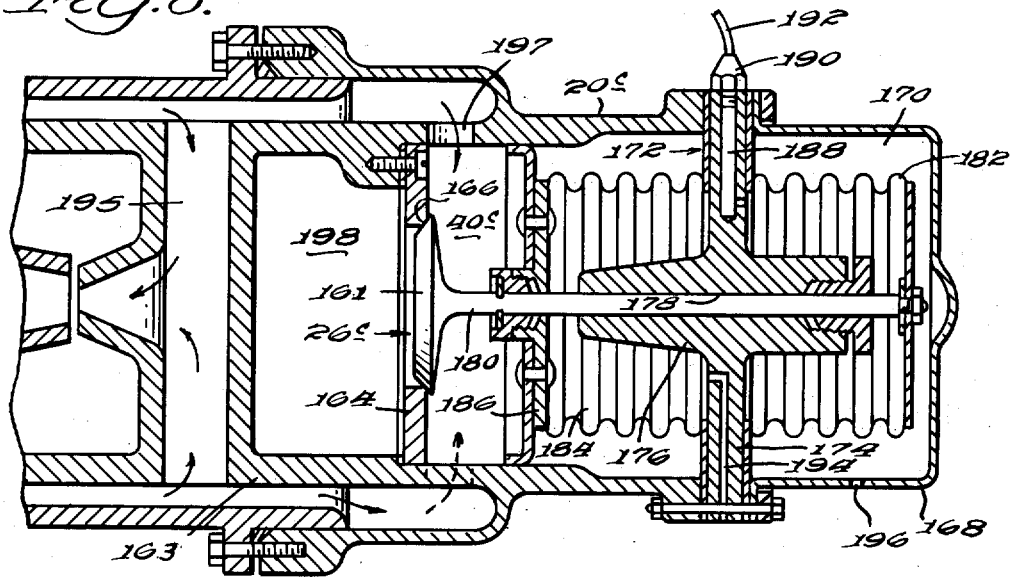
FIGURE 8 is a central vertical sectional view of yet another type of control valve which may be utilized with said apparatus.

Referring now to FIGURE 8, there is shown yet another type of control valve 26c which may be utilized with the aforedescribed apparatus. This control valve 26c is similar to that shown in FIGURE 6 in that its poppet valve 161 is adapted to operate under the influence of the differential between the intake manifold pressure of the engine and the exhaust manifold pressure. To this end, a modified guide member 163 is provided having a wall 164 formed with a valve seat 166. The housing 20c mounts a front closure 168 which cooperates with the front end of this housing in defining a cylindrical chamber 170. A guide element 172 interposed between the housing 20c and the front closure 168 includes an annular plate 174 and an integral boss 176. The latter is formed with a bore 178 that supports the stem 180 of the poppet valve 161 for axial sliding movement. A first metallic bellows 182 is interposed between the front end of the valve stem 180 and the front of the plate 174, while a second similar bellows 184 is interposed between the rear of the plate 174 and an annular heat deflector 186. The latter is rigidly affixed to the rear portion of the valve stem 180 and is slidable within the housing 20c. The interior of the front bellows 182 is in communication with the intake manifold of the engine E through a passage 188, a threaded fitting 190 and a length of tubing 192. The interior of the rear bellows 184 is connected to the atmosphere by a vent passage 194. The annular spacing surrounding the front bellows 182 is connected to the atmosphere by a vent hole 196. The annular space surrounding the rear bellows 184 is connected to the exhaust pressure by virtue of the loose fit of the heat deflector 186 with the walls of the housing 20c.

Under idling conditions of the engine E, the comparatively high intake manifold pressure will cause the poppet valve 161 to be urged rearwardly against the valve seat 166. All the exhaust gases will then flow through the passage-way 195 into the throat of the small venturi 24. As the rotational speed of the engine increases the increased pressure of the exhaust gases entering the front of the housing 20c at 40c through bores 197 will urge the heat deflector 186 forwardly so as to unseat the valve 161. The exhaust gases will then be free to flow through the passage-way 198 into the front of the large venturi 22. It should be noted that flutter of the poppet valve 161 is prevented by the provision of the rear bellows 184, the balancing of the exhaust gas pressures against the atmospheric pressure serving to approximate a more constant pressure control.

Figure 9:
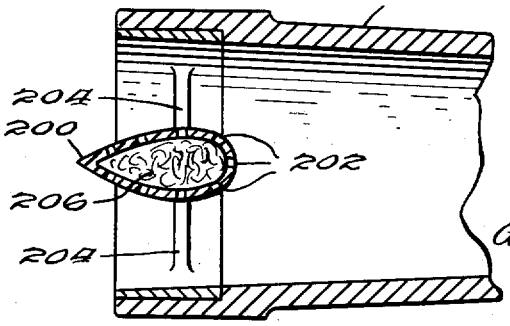
FIGURE 9 is a central vertical sectional view of a special igniter and flame holder which may be utilized with said apparatus.

Referring now to FIGURE 9, there is shown alternate means for effecting the ignition of the gases flowing through the apparatus in place of the spark plug 32. This means includes a streamlined holder 200 formed with apertures 202 and rigidly supported within the rear portion of the large venturi 22d by fingers 204. This holder 200 is filled with a suitable gauze 206 which will serve as a catalyst in the presence of the hydrocarbons flowing through the apparatus for effecting the oxidation thereof. In practice, a platinum gauze has been found suitable. The holder 200 will also serve as a flame holder for preventing the burning of the exhaust gases too far rearwardly of the large venturi 22d.

*The apparatus of FIGURE 9 provides most complete consumption of the unburned products of combustion of the internal combustion engine E. In this regard, it is known that the oxides of nitrogen are not removed in a flame-type burning chamber. In practice it has been found where air is introduced rearwardly of the catalyst through the aperture 70 of the pressure dome 27 the oxides of nitrogen will be effectively removed from the effluent flowing out of the burning chamber. Additionally, with this arrangement more complete removal of the hydrocarbons can be effected.*

Figure 10:
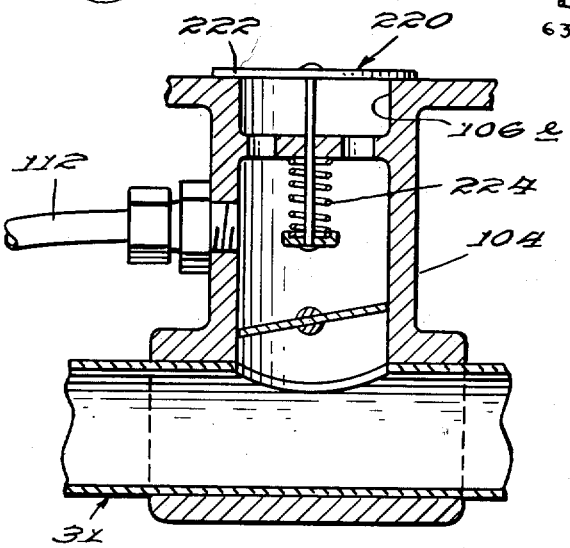
FIGURE 10 is a central vertical sectional view of a one-way valve that may be utilized with said apparatus.

Referring now to FIGURE 10, there is shown a special one-way valve 220 for preventing inadvertent reverse flow into the fresh air manifold 31. This one-way valve 220 may be mounted at the upper end of both of the valve housings 104 and 122. It includes a disc 222 which is constantly biased downwardly by a helical compression spring 224 against the upper end of the vertical passage-way 106e. This disc 222 will be unseated upwardly under the influence of the fresh air aspirated through the tube 94 by the venturi 24. With this arrangement, reverse flow of the exhaust gases downwardly into the tube 94 or into the engine's crankcase through tubing 112 will be prevented.

It should be particularly observed that the aforedescribed apparatus when utilized in conjunction with the engine of an automotive vehicle reduces the sound level of the exhaust gases to such an extent that the conventional muffler may be eliminated. This apparatus also permits the exhaust gas impulses to be tuned so as to provide a reduction of turbulent flow and thereby aid engine efficiency. It should additionally be noted that the entire apparatus may freely contract and expand during temperature changes without damage.

Various modifications and changes may be made with respect to the aforedescribed detailed description without departing from the spirit of the invention or the scope of the following claims.

I claim:

[1. Apparatus for consuming the unburned products of combustion issuing from the exhaust manifold of an internal combustion engine, comprising: a first venturi having communication with said exhaust manifold; a second venturi having communication with said exhaust manifold; means connecting said venturis with the atmosphere; and, means for directing the effluence of said exhaust manifold solely through said second venturi during idling and deceleration of said engine and dividedly through both of said venturis during other operating conditions of said engine.]

[2. Apparatus as set forth in claim 1 where said first venturi is larger than said second venturi.]

[3. Apparatus as set forth in claim 1 which includes ignition means disposed in the path of said effluence.]

4. Apparatus for consuming the unburned products of combustion issuing from the exhaust manifold of an internal combustion engine, comprising: a first venturi having communication with said exhaust manifold; a second venturi disposed within said first venturi and having communication with said exhaust manifold; control valve means for directing the effluence of said exhaust manifold solely through said second venturi during idling and deceleration of said engine and dividedly through both of said venturis during other operating conditions of said engine; an air-intake manifold connecting the throats of said venturis with the atmosphere; and ignition means disposed adjacent the rear portion of said first venturi.

5. Apparatus as set forth in claim 4 where flame-holding means are located in the rear portion of said venturis.

6. Apparatus for consuming the unburned products of combustion issuing from the exhaust manifold of an internal combustion engine, comprising: a housing connected at its front end to said exhaust manifold; a first venturi formed in said housing; a second smaller venturi formed in said housing; normally-closed control valve means in said housing that during idling and deceleration of said engine admits all of the effluence of said exhause manifold into said second venturi; means for opening said control valve means during other operating conditions of said engine whereby part of said effluence will pass through said first venturi; and, an air-intake manifold connecting the throats of said venturis with the atmosphere whereby air will be drawn thereinto in quantities that are proportional to the quantity of said effluence concurrently passing therethrough.

7. Apparatus as set forth in claim 6 where said housing contains ignition means disposed in the path of said effluence.

8. Apparatus as set forth in claim 6 where said control valve means is constantly biased towards a closed position and is moved towards an open position under the influence of the exhaust gases issuing through said exhaust manifold.

9. Apparatus as set forth in claim 6 where said control valve is urged towards a closed position under the influence of the intake manifold pressure of said engine and towards an open position under the influence of the exhaust manifold pressure thereof.

10. Apparatus as set forth in claim 6 where the rear portion of said venturi is in communication with a pressure dampening chamber.

11. Apparatus as set forth in claim 6 where flame holding means are disposed within the rear portion of said first venturi at the point where the velocity of gases passing therethrough equals the velocity of gases entering the front end thereof.

12. Apparatus for consuming the unburned products of combustion issuing from the exhaust manifold of an internal combustion engine, comprising: a housing connected at its front end to said exhaust manifold; a first venturi formed in said housing; a second smaller venturi formed in said housing; normally-closed control valve means in said housing that during idling and deceleration of said engine admits all of the effluence of said exhaust manifold into said second venturi, said control valve means opening during other operating conditions of said engine permitting part of said effluence to pass through said first venturi; a tail pipe forming a continuation of the rear end of said housing; a duct encompassing said tail pipe and having communication therewith by means of ports, said duct being open to the atmosphere; venturi means formed within said tail pipe adjacent said ports; an air-intake manifold connecting said duct with the throats of said venturis whereby during operation of said engine heated air will be drawn thereinto in quantities that are proportional to the quantity of said effluence concurrently passing therethrough.

13. Apparatus as set forth in claim 12 where said air-intake manifold is in communication with the crankcase of said engine.

14. Apparatus as set forth in claim 12 where said control valve means is constantly biased towards a closed position and is moved towards an open position under the influence of the exhaust gases issuing through said exhaust manifold.

15. Apparatus as set forth in claim 12 where said control valve is urged towards a closed position under the influence of the intake manifold pressure of said engine and towards an open position under the influence of the exhaust manifold pressure thereof.

16. Apparatus as set forth in claim 12 where flame holding means are disposed within the rear portion of said first venturi at the point where the velocity of gases passing therethrough equals the velocity of gases entering the front end thereof.

17. Apparatus as set forth in claim 12 where a flame holder is mounted adjacent the rear end of said first venturi, said flame holder including an apertured disc disposed in the path of the gases issuing through said first venturi and normally biased towards a closed position, said disc moving towards an open position when the rotational speed of said engine exceeds a predetermined value.

18. Apparatus as set forth in claim 12 where the rear portion of said first venturi is in communication with a pressure dampening chamber.

19. Apparatus as set forth in claim 18 where flame holding means are disposed within the rear portion of said first venturi at the point where the velocity of gases passing therethrough equals the velocity of gases entering the front end thereof, said pressure dampening chamber being located rearwardly of said flame holding means, and a spark plug is disposed rearwardly of said pressure dampening chamber.

[20. Apparatus for consuming the unburned products of combustion issuing from the exhaust manifold of an internal combustion engine, comprising: first venturi means having communication with said exhaust manifold; second venturi means having communication with said exhaust manifold; means connecting said venturi means with the atmosphere; and means for directing the effluence of said exhaust manifold either dividedly through both of said venturi means or alternately through solely said second venturi means depending upon the pressure of said effluence.]

[21. Apparatus as set forth in claim 20 where said first venturi means is larger than said second venturi means.]

22. Apparatus for consuming the unburned products of combustion issuing from the exhaust manifold of an internal combustion engine into a discharge pipe, comprising: a housing interposed between said exhaust manifold and said discharge pipe so as to transfer the effluence from said exhaust pipe to said discharge pipe for subsequent release into the atmosphere, said housing being formed with a burning chamber through which said effluence passes; ignition means disposed in said burning chamber; first air supply means operatively connected with said housing to direct air into said burning chamber; second air supply means operatively connected with said housing to direct air into said burning chamber; and control means operatively connected to said first and second air supply means and responsive to the load condition of said engine to automatically actuate said first air supply means to admit the major proportion of air to said burning chamber during engine operations other than idling and deceleration, said control means automatically actuating said second air supply means to admit the major proportion of air to said burning chamber during idling and deceleration of said engine.

23. Apparatus for consuming the unburned products of combustion issuing from the exhaust manifold of an internal combustion engine into a discharge pipe, comprising: a housing interposed between said exhaust manifold and said discharge pipe so as to transfer the effluence from said exhaust pipe to said discharge pipe for subsequent release into the atmosphere, said housing being formed with a burning chamber through which said effluence passes; ignition means disposed in said burnng chamber; first air supply means operatively connected with said housing to direct air into said burning chamber; second air supply means operatively connected with said housing to direct air into said burning chamber; and control means operatively connected to said first and second air supply means and responsive to the pressure of said effluence to automatically actuate said first air supply means to admit the major proportion of air to said burning chamber when the pressure of said effluence exceeds a predetermined value, said control means automatically actuating said second air supply means to admit the major proportion of air to said burning chamber when the pressure of said effluence falls below said predetermined value.

*24. Apparatus for consuming the unburned products of combustion issuing from the exhaust manifold of an internal combustion engine into a discharge pipe, comprising: a housing that receives said unburned products of combustion; a flame type burning chamber in said housing that initially receives said products of combustion; passage means connecting said burning chamber with the atmosphere to provide the fresh air required to effect burning of said products of combustion within said burning chamber; a catalyst disposed in said housing in the path of the effluent flowing out of said burning chamber; and second passage means operatively connected with said housing and connecting said housing directly with the atmosphere on the side of said catalyst downstream of said catalyst so as to introduce additional fresh air at this point.*

*25. Apparatus for consuming the unburned products of combustion issuing from the exhaust manifold of an internal combustion engine into a discharge pipe, comprising a housing that receives said unburned products of combustion; wall means disposed within said housing and defining a flame type burning chamber; means connecting the interior of said housing with said burning chamber whereby said unburned products of combustion received by said housing will flow through said housing in heat-transfer relationship with said wall means before entering said burning chamber; passage means connecting said burning chamber with the atmosphere to provide the fresh air required to effect burning of said products of combustion within said burning chamber; a catalyst*

*disposed in said housing in the path of the effluent flowing out of said burning chamber; and second passage means operatively connected with said housing and connecting said housing directly with the atmosphere on the side of said catalyst downstream of said catalyst so as to introduce additional fresh air at this point.*

*26. Apparatus for consuming the unburned products of combustion issuing from the exhaust manifold of an internal combustion engine into a discharge pipe, comprising: a housing that receives said unburned products of combustion; wall means disposed within said housing and defining a flame type burning chamber; means connecting the interior of said housing with said burning chamber whereby said unburned products of combustion received by said housing will flow through said housing in heat-transfer relationship with said wall means before entering said burning chamber; passage means connecting said burning chamber with the atmosphere to provide the fresh air required to effect burning of said products of combustion within said burning chamber; and second passage means operatively connected with*

*said housing and connecting said housing directly with the atmosphere downstream of said burning chamber so as to introduce additional fresh air downstream of said burning chamber.*

References Cited in the file of this patent or the original patent

UNITED STATES PATENTS

| | | |
|---|---|---|
| 1,468,895 | Allen | Sept. 25, 1923 |
| 1,605,484 | Thompson et al. | Nov. 2, 1926 |
| 1,789,812 | Frazer | Jan. 20, 1931 |
| 1,848,990 | Boyd et al. | Mar. 8, 1932 |
| 1,875,024 | Kryzanowsky | Aug. 30, 1932 |
| 2,065,681 | Fogas | Dec. 29, 1936 |
| 2,308,059 | Decker | Jan. 12, 1943 |
| 2,679,724 | Pomykala | June 1, 1954 |

FOREIGN PATENTS

| | | |
|---|---|---|
| 631,736 | France | Sept. 20, 1927 |
| 60,247 | Netherlands | Nov. 15, 1947 |